US008224758B2

(12) United States Patent
Humprecht et al.

(10) Patent No.: US 8,224,758 B2
(45) Date of Patent: Jul. 17, 2012

(54) SYSTEMS AND METHODS FOR MANAGING THE TRANSPORTATION OF DANGEROUS MATERIALS

(75) Inventors: Hans-Christian Humprecht, Heidelberg (DE); Jette Bork-Wagenblast, Darmstadt (DE); Birger Schuett, Markdorf (DE); Andreas Chudalla, Vilshelm (DE)

(73) Assignee: SAP AG, Walldorf (DE)

( * ) Notice: Subject to any disclaimer, the term of this patent is extended or adjusted under 35 U.S.C. 154(b) by 1144 days.

(21) Appl. No.: 11/589,049

(22) Filed: Oct. 30, 2006

(65) Prior Publication Data

US 2008/0120203 A1 May 22, 2008

(51) Int. Cl.
G06Q 30/00 (2012.01)
G06F 19/00 (2011.01)
H04L 9/32 (2006.01)

(52) U.S. Cl. ............... 705/332; 700/106; 713/166
(58) Field of Classification Search .......... 705/332; 700/106; 713/166
See application file for complete search history.

(56) References Cited

U.S. PATENT DOCUMENTS

| | | | | |
|---|---|---|---|---|
| 5,664,112 | A * | 9/1997 | Sturgeon et al. | 705/28 |
| 6,163,732 | A * | 12/2000 | Petke et al. | 700/106 |
| 6,688,475 | B2 * | 2/2004 | Petrancosta | 209/546 |
| 7,346,519 | B2 * | 3/2008 | Carr et al. | 705/313 |
| 2002/0004768 | A1 * | 1/2002 | Sekine et al. | 705/28 |
| 2002/0059107 | A1 * | 5/2002 | Reich et al. | 705/26 |
| 2002/0095572 | A1 * | 7/2002 | Frank et al. | 713/166 |
| 2003/0172007 | A1 * | 9/2003 | Helmolt et al. | 705/28 |
| 2004/0098356 | A1 * | 5/2004 | Shabtai | 706/45 |
| 2004/0148052 | A1 * | 7/2004 | Ferguson et al. | 700/213 |
| 2005/0071259 | A1 * | 3/2005 | Arai et al. | 705/28 |
| 2005/0119926 | A1 * | 6/2005 | Turetsky et al. | 705/8 |
| 2005/0165629 | A1 * | 7/2005 | Bruns | 705/6 |
| 2005/0197789 | A1 * | 9/2005 | Niermann et al. | 702/23 |
| 2005/0216294 | A1 * | 9/2005 | Labow | 705/1 |
| 2005/0228688 | A1 * | 10/2005 | Visser et al. | 705/1 |
| 2006/0075181 | A1 * | 4/2006 | Modesitt | 711/100 |
| 2007/0100829 | A1 * | 5/2007 | Allen et al. | 707/9 |
| 2009/0282346 | A1 * | 11/2009 | Bechtel et al. | 715/751 |
| 2010/0153343 | A1 * | 6/2010 | Guldner et al. | 707/689 |
| 2011/0208663 | A1 * | 8/2011 | Kennis et al. | 705/317 |

OTHER PUBLICATIONS

J. J. Keller and Associates, www.truklink.com, 2002.*
Simon, Jeffrey C., Occupational Healthy and Safety, Sep. 2001, V2N4, p. 6-9.*
Chisholm, Terri A., "Air Cargo Carriers", Global Trade and Transportation's Guide to Hazmat Carriers, Jul. 1993, V113N7, p. 15-19.*

* cited by examiner

*Primary Examiner* — Fadey Jabr
(74) *Attorney, Agent, or Firm* — Finnegan, Henderson, Farabow, Garrett & Dunner, LLP

(57) ABSTRACT

Systems and methods are provided for managing the transportation of dangerous materials. In one embodiment, a system is provided. The system comprises a database for storing master data for a set of materials. Each material has an assigned regulation applicable for the transportation of the material. The master data indicates at least one exception of one of the assigned regulations. The at least one exception defines a modification of the one of the regulations. The system further comprises a user interface for selection of a sub-set of the set of materials to be transported and a processor for checking compliance of the sub-set with the regulations that are assigned to the materials of the sub-set.

18 Claims, 12 Drawing Sheets

Database — 102

Material Master — 132

| Material ID | Name |
|---|---|
| 123456 | Green paint |
| 234567 | Red paint |
| ooo | ooo |

Exception — 134

| Exception ID | Name | Regulation |
|---|---|---|
| E1 | Transp. ok | ADR |
| E2 | Weight ok | IMDG |
| ooo | ooo | ooo |

Dangerous Materials Master — 136

| Material ID | Regulation | Exception |
|---|---|---|
| 123456 | ADR | — |
| 234567 | IMDG | E2 |
| ooo | ooo | ooo |

| | Dangerous Goods Master  Edit  Goto  Utilities(M)  Environment  System  Help |
|---|---|

Change Dangerous Goods Master: Detail Views

| Material | XDHUCMAT1090_A0005 | 0,5L Flasche Acetone LQ | Change No. | | Valid From | 01.01.0001 |
| Regulation | ADR | ADR | Key date | 12.09.2006 | Valid To | 31.12.9999 |

/ Classification / Substance Rating / Substance Properties / Packaging / Labeling / Exceptions / Printed Texts /

| DG Exception | Description | StB | Unt. | UN- | Lan. | Zuo. | FROM | TO |
|---|---|---|---|---|---|---|---|---|
| BW_MOT_OKAY | Exception concerning mode of transport category | ☑ | ☐ | ☐ | ☐ | 1 | 16.08.2006 | 31.12.9999 |
| | | ☑ | ☐ | ☐ | ☐ | 0 | | |
| | | ☑ | ☐ | ☐ | ☐ | 0 | | |
| | | ☑ | ☐ | ☐ | ☐ | 0 | | |

SYSTEMS AND METHODS FOR MANAGING THE TRANSPORTATION OF DANGEROUS MATERIALS

BACKGROUND

I. Technical Field

The present invention generally relates to the field of transportation of dangerous materials in order to ensure compliance with applicable regulatory requirements.

II. Background Information

The shipment of hazardous or dangerous materials is strictly regulated by several National and International organizations. Depending on the materials to be transported and depending on the transportation route, one or more of the following international regulatory conventions may have to be complied with: ADR (European Agreement concerning the international carriage of dangerous goods by road), RID (Regulation concerning the international transportation of dangerous goods by railway), IMDG Code (International Maritime Dangerous Goods Code), ADNR (European Agreement concerning the transportation of dangerous goods by ship on the river Rhine).

In addition, national laws concerning the transportation of dangerous goods may also need to be complied with depending on the transportation route. For example, both the International Air Transportation Association (IATA) and U.S. Department of Transportation (DOT) regulate the shipment of "dangerous goods." Under Section 2.7 of the IATA regulations and under 49 C.F.R. 173.4 and HM 181 of the DOT regulations, certain exceptions are made to otherwise extremely stringent requirements for the shipment of dangerous goods. These exceptions are generally referred to as "Dangerous Goods In Excepted Quantities," or "Exceptions for Small Quantities."

For example, in order to qualify for shipment under "Dangerous Goods In Excepted Quantities," the general rule is that no more than 30 ml of a hazardous liquid or 30 grams of a hazardous solid (such as oxidizers or corrosives) can be shipped within a single bottle. In addition, any container (e.g. box) enclosing the bottle holding the hazardous material must meet a number of Federally mandated tests including a drop test, a stack test, an internal pressure test, a Cobb water absorption test, and a vibration test. If the entire containment assembly passes these tests, it meets these requirements and can be shipped by passenger or cargo aircraft. In addition, since regulations for air transport are more stringent than for ground transport, compliance with these air regulations ensures compliance with applicable ground transport regulations as well. Even when shipping dangerous goods in "Excepted Quantities," there are a number of stringent regulatory requirements that must be met. Accordingly, systems and methods disclosed herein are directing to addressing these requirements.

SUMMARY

Embodiments consistent with the present invention relate to systems, methods and computer readable media for managing the transportation of dangerous materials. Embodiments consistent with the invention also relate to distributed systems for managing the transportation of dangerous materials, such as distributed enterprise resource planning (ERP) systems.

Embodiments consistent with the invention include a system for managing the transportation of dangerous materials. The system may comprise a database for storing master data for a set of materials. Each material may have an assigned regulation applicable for the transportation of the material. The master data may be indicative of at least one exception of one of the assigned regulations. The at least one exception may define a modification of the one of the regulations. A user interface may enable selection of a sub-set of the set of materials to be transported. A processor may check compliance of the sub-set with the regulations that are assigned to the materials of the sub-set.

Embodiments consistent with the invention may facilitate the modification of the applicable regulations by allowed exceptions. Handling of an exception can be performed automatically by storing the exception as part of the master data or it may require some degree of user interaction. As an alternative, or in addition, an exception can also be defined by entering respective transactional data which may require some manual user interaction.

In accordance with embodiments consistent with the invention, the database may be adapted to store first master data comprising material master data, second master data for assigning the regulations to the materials and for indicating the existence of the at least one exception, and third master data for defining the at least one exception.

Embodiments consistent with the invention may include a document generator for generating transportation documentation for the transportation of the materials. The document generator may be adapted to generate a document for the transportation documentation indicating the at least one exception.

Embodiments consistent with another aspect of the invention include a method of managing the transportation of dangerous materials. The method may comprise selecting a sub-set of a set of materials from a database. The database may store master data for the set of materials. Each material may have an assigned regulation applicable for the transportation of the material. The master data may indicate at least one exception of one of the assigned regulations. The exception may define a modification of the one of the regulations. The sub-set may be checked for compliance with the regulations that are assigned to the materials of the sub-set.

Embodiments consistent with yet another aspect of the invention include a computer program product including instructions for execution by a processor to perform a method of managing the transportation of dangerous materials.

Embodiments consistent with yet another aspect of the invention include a distributed system for managing the transportation of dangerous materials. The distributed system may comprise a root system and a plurality of target systems being linked to the root system by means of a telecommunications network. The root system may further comprise a database for storing master data for a set of materials. Each material may having an assigned regulation applicable for the transportation of the material. The master data may indicate at least one exception of one of the assigned regulations. The at least one exception may define a modification of the one of the regulations. A user interface may enable selection of a sub-set of the set of materials to be transported. A processor may check compliance of the sub-set with the regulations that are assigned to the materials of the sub-set. An interface may replicate the master data in the target systems. The target systems may comprise a database for storing replicated master data for a set of materials. Each material may have an assigned regulation applicable for the transportation of the material. The master data may be indicative of at least one exception of one of the assigned regulations. The at least one exception may define a modification of the one of the regulations. A user interface may enable selection of a sub-set of the set of materials to be transported. A processor may check compliance of the sub-set with the regulations that are assigned to the materials of the sub-set. An interface may replicate the master data by the route system, thereby facilitating the distribution of updated exceptions from the route system to the various target systems.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 2 illustrates an exemplary database structure for storing master data including exceptions, consistent with the invention;

FIG. 7 illustrates an exemplary window of a user interface for entering delivery data including a message indicating the result of a compliance check, consistent with the invention;

FIG. 8 illustrates an exemplary window of a user interface for entering an exception into mater data, consistent with the invention;

DESCRIPTION OF THE EMBODIMENTS

Figure 1:
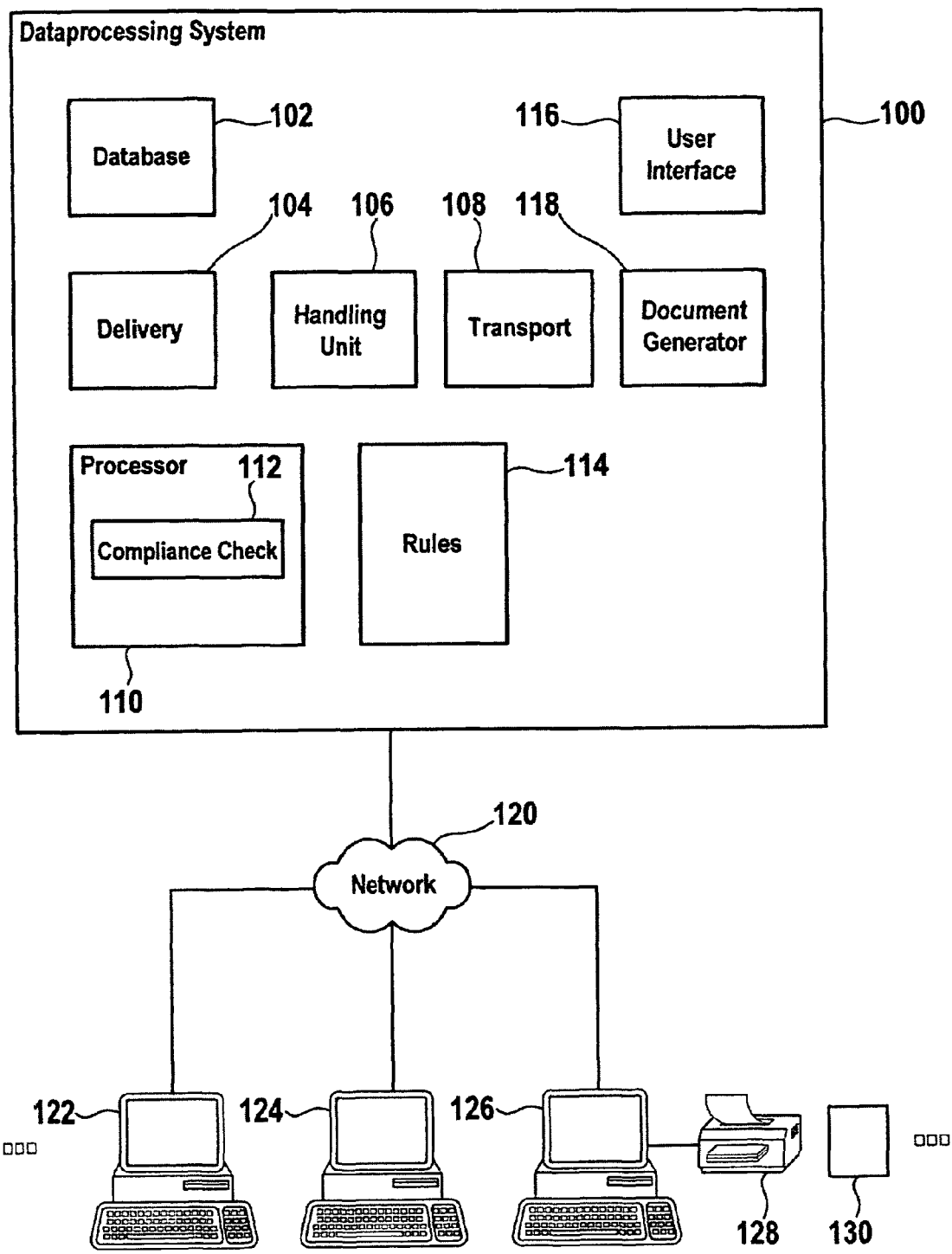
FIG. 1 illustrates a block diagram of an exemplary system for managing the transportation of dangerous materials, consistent with the invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Embodiments consistent with the present invention are directed to systems, methods, and computer-readable media for managing the transportation of dangerous materials. Embodiments consistent with the invention may be implemented in various environments, including computer-based environments, such as personal computers, workstations, servers, laptops, and other computing devices, workstation, networked and other computing-based environments with one or more users. The present invention, however, is not limited to such examples and may be implemented with other platforms and in other environments.

By way of example, embodiments consistent with the invention may be implemented using conventional personal computers (PCs), desktops, hand-held devices, multiprocessor computers, microprocessor-based or programmable electronic devices, minicomputers, mainframe computers, personal mobile computing devices, portable or stationary personal computers, or the like.

The storage media referred to herein symbolize elements that temporarily or permanently store data and instructions. Although storage functions may be provided as part of a computer, memory functions can also be implemented in a network, processors (e.g., cache, register), or elsewhere. Various types of storage mediums can be used to implement features of the invention, such as a read-only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments consistent with the invention may also include computer program products that are stored in a computer-readable storage medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network may be a wired or a wireless network. To name a few network implementations, the network may be, for example, a local area network (LAN), a wide area network (WAN), a public switched telephone network (PSTN), an Integrated Services Digital Network (ISDN), an infrared (IR) link, a radio link, such as a Universal Mobile Telecommunications System (UMTS), Global System for Mobile Communication (GSM), Code Division Multiple Access (CDMA), or a satellite link.

Transmission protocols and data formats are also known, such as, for example, transmission control protocol/internet protocol (TCP/IP), hyper text transfer protocol (HTTP), secure HTTP, wireless application protocol, unique resource locator (URL), unique resource identifier (URI), hyper text markup language (HTML), extensible markup language (XML), extensible hyper text markup language (XHTML), wireless application markup language (WML), Standard Generalized Markup Language (SGML), SOAP (simple object access protocol), etc. Such features may be utilized to implement embodiments consistent with the present invention, as disclosed herein.

Systems, methods, and computer-readable media, consistent with embodiments of the present invention, may facilitate the handling of exceptions of regulatory provisions in order to improve the management of the transportation of dangerous materials. In particular, embodiments of the present invention facilitate usage of a data processing system for partly or fully automatically handling exceptions. Consistent with the invention, exceptions can be defined by entering respective master data in a database of the data processing system and/or by a user's entry of transactional data indicating that an exception is to be applied.

The term "material" as used herein refers to any kind of dangerous good, hazardous substance or other kind of dangerous material to which at least one regulatory provision regarding the rules for transportation applies.

Embodiments consistent with the present invention may efficiently protect the environment against the risks involved in the transportation of dangerous materials. Embodiments consistent with the present invention may also protect the transportation of dangerous materials against acts of sabotage and terrorism. Such protection may occur because embodiments of the invention may ensure that the correct regulatory provisions for the transportation of dangerous goods, including exceptions, are applied, thereby excluding to a large extent the risk of human error when implementing complex regulations.

FIG. 1 illustrates an exemplary data processing system 100 in which embodiments consistent with the present invention may be implemented. As illustrated in FIG. 1, data processing system 100 includes a database system 102 for storing master data relating to the transportation of dangerous materials, a component 104 for entering and processing of delivery data, a component 106 for entering and processing of handling unit data, and a component 108 for entering and processing of transportation route data.

Data processing system 100 includes at least one processor 110 that executes program instructions 112. Processor 110 may perform one or more compliance checks on delivery data, handling unit data, and/or transportation route data by execution of program instructions 112.

Compliance checks are performed using rules reflecting the applicable regulations. These rules are stored in a rule base 114. For example, the rules stored in rule base 114 may include provisions of international agreements and treaties as well as national legal provisions regarding the transportation of dangerous materials in encoded format that is interpretable by program instructions 112.

Data processing system 100 may include a component 116 for providing a user interface or various kinds of user interfaces. For example, a user interface provided by component 116 facilitates entry of master data into database 102 as well as entry of delivery data into component 104, handling unit data into component 106, and transportation route data into component 108. The user interface provided by component 116 may also be used for displaying the result of a compliance check performed by processor 110.

Data processing system 100 may further include a document generator 118 for generating a print file in order to print a transportation documentation, such as labels and other transportation documents that are required for compliance with the applicable regulatory provisions. This may include explanatory texts of any exception that is used for the transportation of a given dangerous material.

A number of client computers (e.g., 122, 124, 126, etc.) may be closely or loosely coupled to data processing system 100 via a network 120. Client computers 122, 124, 126 may be used by various users for viewing, entering, and/or editing master data into database system 102. Further, client computers 122, 124, 126 may allow a user to enter delivery data, handling unit data, and/or transportation route data to manage the transportation of one or more dangerous materials. Still further, client computers 122, 124, 126 may allow a user to view results of a compliance check that has been performed by processor 110 and/or print a transportation documentation using a print file generated by document generator 118.

For example, client computer 126 is coupled to a printer 128 for printing a transportation documentation including an adhesive label 130 to be attached to a package of the dangerous material to be transported and/or to be attached to a handling unit, such as a container.

Data processing system 100 may be implemented using object-oriented technologies and/or a service-oriented architecture (SOA). In particular, the compliance check provided by processor 110 may be implemented as a service that can be consumed by components 104, 106 and 108. Further, components 104, 106 and 108 may be implemented as business objects. In order to manage the transportation of one or more dangerous materials, respective business objects are instantiated by entering user data.

In operation, a user of, for example, client computer 126 may instantiate a business object provided by component 104 by entering of delivery data specifying dangerous materials and their respective quantities to be delivered. Upon completion of the entry of the delivery data, program instructions 112 are executed. A compliance check is then performed in accordance with applicable regulations and their exceptions, if any, as specified in database system 102 using respective rules stored in rule base 114.

If the dangerous materials to be transported in accordance with the delivery data are in compliance with the applicable regulations, a respective signal may be outputted via the user interface 116 and the document generator 118 may be invoked for generating respective transportation documentation, including adhesive label 130. The documentation is printed on the printer 128 coupled to the client computer 126.

If the conditions of the transportation of the dangerous materials specified by the delivery data are found to be non-compliant with the applicable regulations in one or more respects, a respective error signal is outputted via user interface 116. In response, the user may re-attempt to initiate the transportation of the selected dangerous materials by entering additional transactional data into component 104 for specifying a transactional exception. The term "transactional exception" as used herein relates to the specification of an exception to an applicable regulation by means of transactional data. The same exception may or may not be specified as part of the master data stored in database system 102.

Further, selection of a transactional exception can be within the discretion of an authorized user's decision. The user's decision whether to apply or not to apply the transactional exception may depend on facts or information that is not available in data processing system 100, such as weather conditions, the existence of a civil or military emergency situation, or the like.

Upon entry of the transactional exception, execution of program instructions 112 is restarted in order to perform the compliance check using the transactional exception. If the conditions of the transportation of the dangerous materials as specified in the delivery data is now in compliance with the applicable regulation or regulations, as modified by the transactional exception, a respective signal is outputted via user interface 116 and document generator 118 may be started for generating the respective transportation documentation including an explanatory note regarding the exception that has been used. Further, an analogous process may be used for checking the handling unit data and the transportation route data for compliance.

FIG. 2 shows an exemplary structure of the database provided by database system 102 of FIG. 1, consistent with an embodiment of the present invention.

Database system 102 may include one or more material master database tables 132. Entry of each material master database table 132 may comprise a material specific access key, such as a material identifier (ID), and properties, attributes and/or other information regarding the respective material. For example, a first material managed by means of the data processing system 100 may have a material ID=123456. The property of this material is "green paint." Similarly, material ID=234567 is "red paint," etc.

Further, database system 102 may comprise one or more exception database tables 134 for storing exception data as part of the master data. Each entry into an exception database table 134 may comprise an exception specific key, such as an exception identifier (ID), a descriptive name of the exception, and a regulation to which the exception may be applicable. For example, exception database table 134 may comprise a first exception E1 that may be applicable to the regulation ADR. The first exception E1 may relate to an exception to the rules of transportation specified in ADR. Similarly, a second exception E2 may be applicable to the IMDG for defining an exception to the rules relating to the weight of the dangerous materials to be transported.

Further, database system 102 may comprise one or more dangerous materials database tables 136 as part of the master data. Database tables 136 may be referred to as "Dangerous Goods Master." Each entry into a dangerous materials database table 136 may comprise the material ID of the material to which the entry relates, an indication of the regulation that is applicable to the material, and an indication of an exception that can be applied to the regulation. For example, dangerous materials database table 136, as shown in FIG. 2, includes an entry for the first material with the material ID=123456. The entry specifies ADR as the regulation that is applicable to this material. No exception is specified in this entry such that the regulation ADR is to be applied without modification.

Similarly, the dangerous materials database table 136 contains an entry for the second material having the material ID=234567. The entry specifies IMDG as the applicable regulation and includes the exception ID=E2. Accordingly, the regulation IMDG is to be applied to the transportation of the material 234567 ('red paint') with the exception E2 as specified in exception database table 134.

Figure 3:
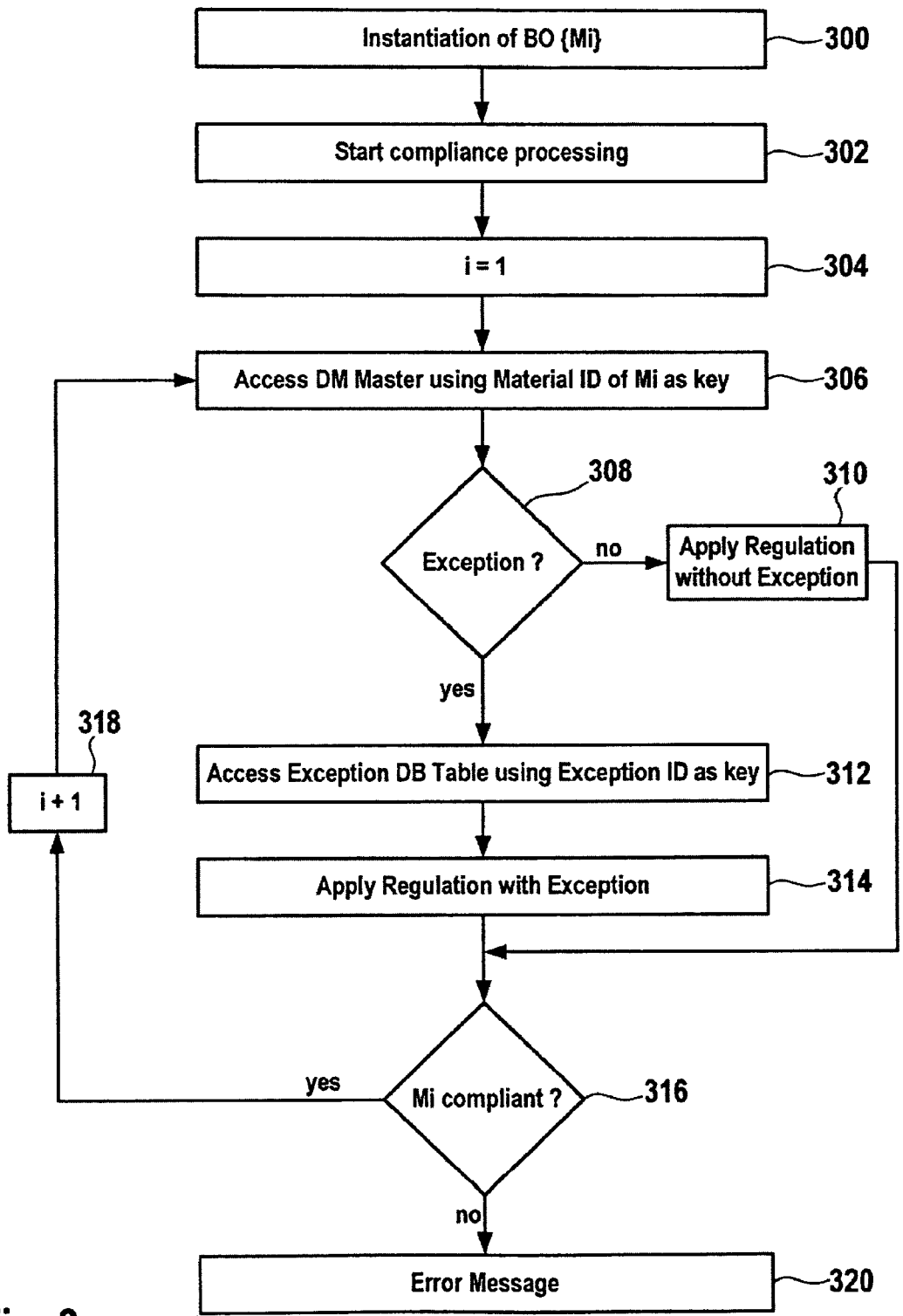
FIG. 3 is a flowchart of an exemplary method for managing the transportation of dangerous materials, consistent with the invention.

FIG. 3 illustrates an exemplary flowchart, consistent with an embodiment of the present invention. In step 300, one of the business objects related to the transportation of dangerous materials may be instantiated, such as the business object provided by the component 104, 106 or 108. The business object may be instantiated by specifying a sub-set of the set of dangerous materials that can be managed by the data processing system. This sub-set of materials M1, M2, M3, . . . Mi, . . . MI is denoted {MI} in the following.

Next, in step 302, compliance processing is started by initiating the index i (step 304). In step 306, the dangerous materials (DM) database table containing the DM master data is accessed using the material ID of M1 and the applicable regulation as an access key.

In step 308, it is determined whether the respective entry of dangerous materials database table 136 indicates an exception or not. If no exception is indicated, then the process proceeds to step 310 in which the applicable regulation is applied without any exception. However, if an exception is indicated in step 308, then the process proceeds to step 312 in which the exception database table is accessed using the exception ID given in the dangerous materials database table as an access key. In step 314, the regulation given in the dangerous materials database table is applied with the modification as given by the exception specified in the exception database table.

In step 316, a determination is made whether the material M1 is compliant with the applicable regulation without (step 310) or with an exception (step 314). If M1 is compliant, the process proceeds to step 318 in order to increment the index i.

In the following, steps 306 to 316 are carried out repetitively until all materials Mi of the sub-set of materials {MI} have been processed, i.e., until i=I. If one of the materials Mi is found to be non-compliant in step 316, then the process proceeds to step 320 in order to output an error message.

Figure 4:
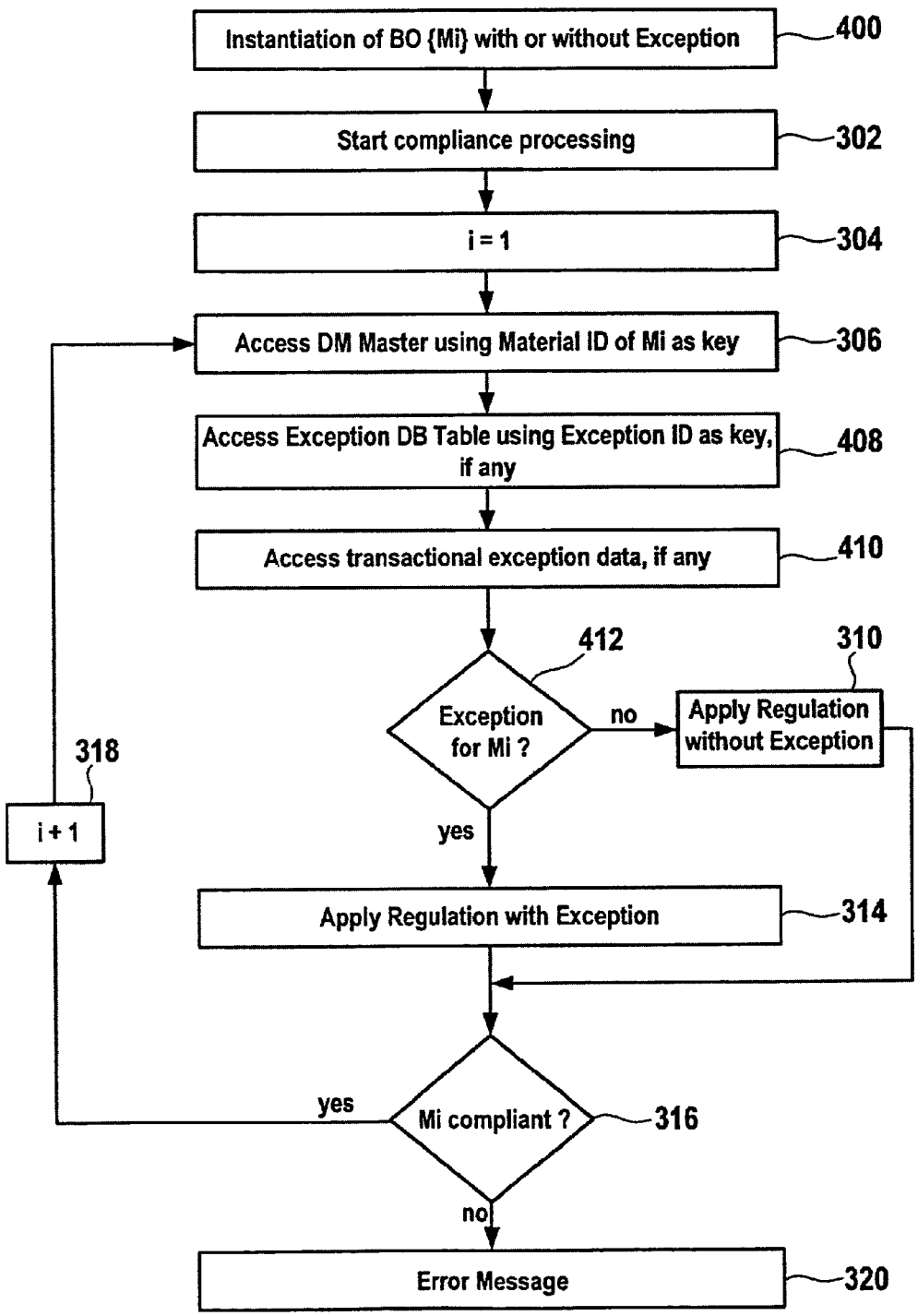
FIG. 4 is a flowchart of an exemplary method for managing the transportation of dangerous materials, consistent with the invention.

FIG. 4 is a flowchart of an exemplary method for managing the transportation of dangerous materials, consistent with an embodiment of the present invention. Step 400 is analogous to step 300 of the embodiment discussed in relation to FIG. 3. In method shown in FIG. 4, a user may enter a transactional exception as part of the transactional data for instantiation of the business object. By means of the transactional exception, a regulation that is applicable to one or more of the materials Mi can be modified. The following steps 302 to 306 may be substantially identical to the respective steps of the embodiment shown in FIG. 3.

In step 408, the exception database table is accessed using an exception ID obtained from the dangerous materials database table for reading an applicable exception from the master data. Step 408 is not executed if no exception ID is given in the respective entry of the dangerous materials database table that has been accessed in the preceding step 306.

In step 410, the transactional exception data contained in the instantiated business object is read if such transactional exception data is available. In step 412, it is determined whether the applicable regulation for the transportation of dangerous material Mi is modified by an exception. In other words, it is checked if an exception is specified in the master data and/or as transactional exception data.

The following steps 310 to 320 may be substantially identical to those of the embodiment of FIG. 3.

Figure 5:
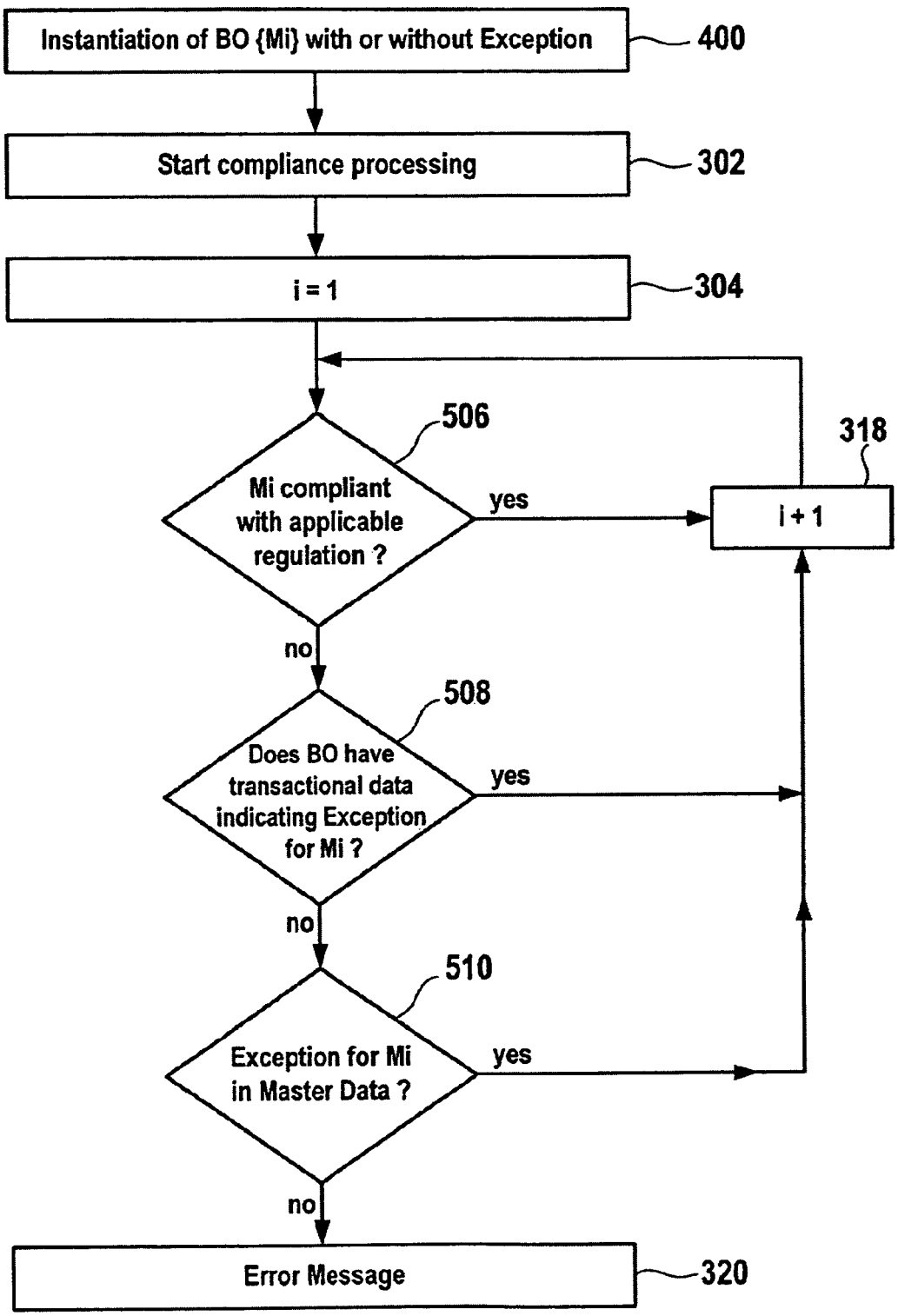
FIG. 5 is a flowchart of an exemplary method for managing the transportation of dangerous materials, consistent with the invention.

FIG. 5 is a flowchart illustrating an exemplary method, consistent with an embodiment of the invention. The initial steps 400, 302 and 304 are substantially identical to those of the embodiment of FIG. 4. In step 506, it is determined whether the dangerous material Mi is compliant with the applicable regulation specified in the dangerous material database table. If this is the case, the existence or non-existence of any exception is irrelevant as the material Mi is already in compliance with the non-modified regulation. Therefore, in case of compliance, the process proceeds from step 506 directly to step 318.

If the contrary is the case, it is determined in step 508 whether the instantiated business object contains transactional exception data indicating an exception to the regulation which is applicable for the material Mi. If such transactional data is in fact available, and the conditions of transportation as specified in the instantiated business object are in compliance with the applicable regulation as modified by the transactional exception, the process proceeds from step 508 to step 318. If the contrary is the case, then the process proceeds from step 508 to step 510 where a determination is made whether an exception is specified for the regulation to be applied in the master data. If this is the case and if application of the exception leads to compliance, then the process proceeds from step 510 to step 318. Otherwise, the process proceeds to step 320.

Figure 6:
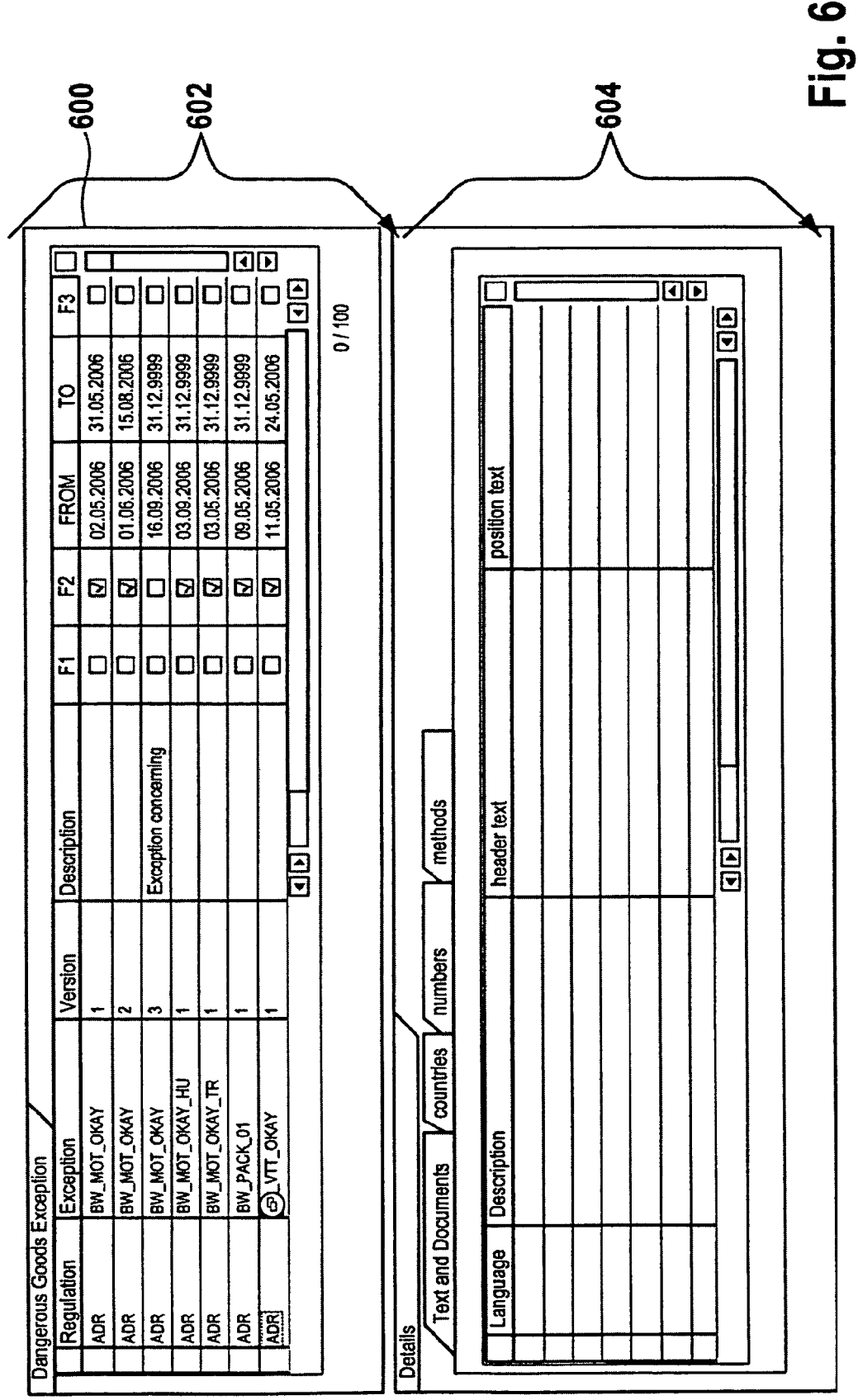
FIG. 6 is an exemplary window of a user interface for editing exceptions in the master data, consistent with the invention.

FIG. 6 illustrates an exemplary window 600 for viewing and editing exception master data that is stored in the exception database table, consistent with an embodiment of the present invention. Window 600 includes a header portion 602 for entering header information and a details-portion 604 for entering details regarding exceptions.

Header portion 602 has a tabular structure. The first column of header portion 602 indicates the dangerous materials regulation, such as ADR or another regulation. The next column specifies an exception that may be applicable to the respective regulation. The next column specifies the version of the exceptions and consecutive columns comprise a description of the exception, a flag F1, F2, the duration "from" and "to" of validity of the exception, and a flag F3.

When an exception is initially created, it is automatically locked by setting flag F1. In order to enable the assignment of an exception to one of the regulations, flag F1 has to be deactivated by an authorized user. Flag F2 is set automatically when an exception is distributed from a route system to a target system as it will be explained in more detail below with reference to FIG. 12. Flag F3 is set if the exception is company specific.

Detailed-portion 604 includes virtual tabs, such as "text and documents," "countries," "UN numbers" and "methods" for indicating respective detail information for each of the exceptions contained in header portion 602. If the "texts and documents" tab is selected, as shown in FIG. 6, information regarding the language, the description of the exception, the header text for the transportation documents and a position text for the transportation documents can be entered, edited and/or viewed.

Figure 7:
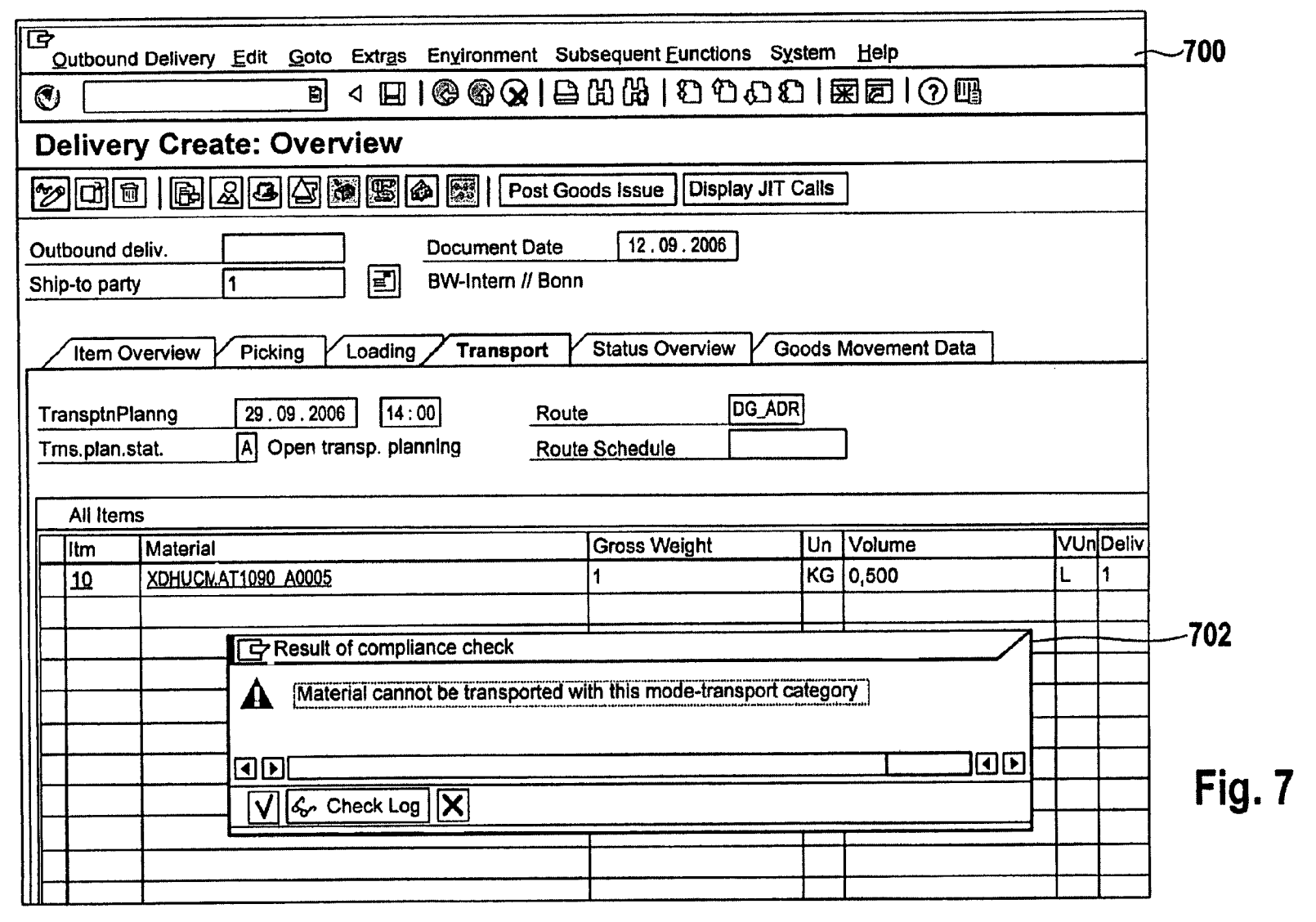

FIG. 7 illustrates an exemplary window 700 for instantiating a delivery. In the example considered here, a user has already entered the respective data for instantiating the delivery business object such that the compliance check has been executed by the processor. As a result, a message 702 is outputted indicating that the selected material cannot be transported with the selected mode-of-transport category.

In response, the user can access the dangerous materials database table in order to check whether an exception is available for that material in accordance with the master data. The respective information is displayed on a window 800, as shown in FIG. 8. In the example considered here, an exception is in fact available. If application of this exception is asserted by a respective user entry, the compliance check is re-executed on the basis of the applicable regulation as modified by the exception.

Figure 9:
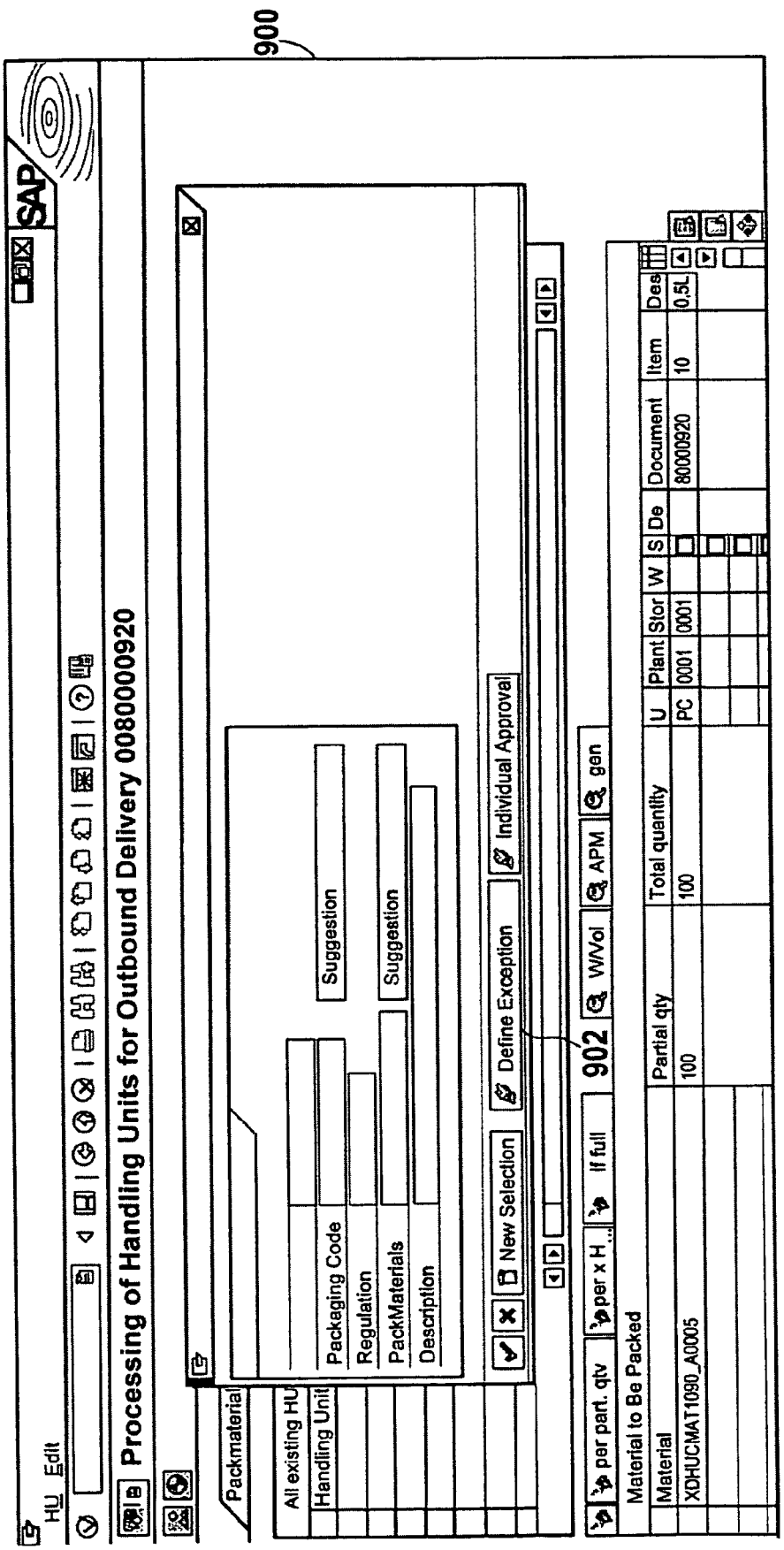
FIG. 9 illustrates an exemplary window of a user interface for entering handling unit data, consistent with the invention.

FIG. 9 illustrates an exemplary window 900 for entering user data for the instantiation of a business object relating to a handling unit. The handling unit data may include a "packaging code," and an indication of the packaging materials "packmaterials," and a description. The handling unit data also includes the respective material ID, the quantity of the material and other handling unit information. By selecting button 902, the user can enter a transactional exception for the instantiated handling unit.

Figure 10:
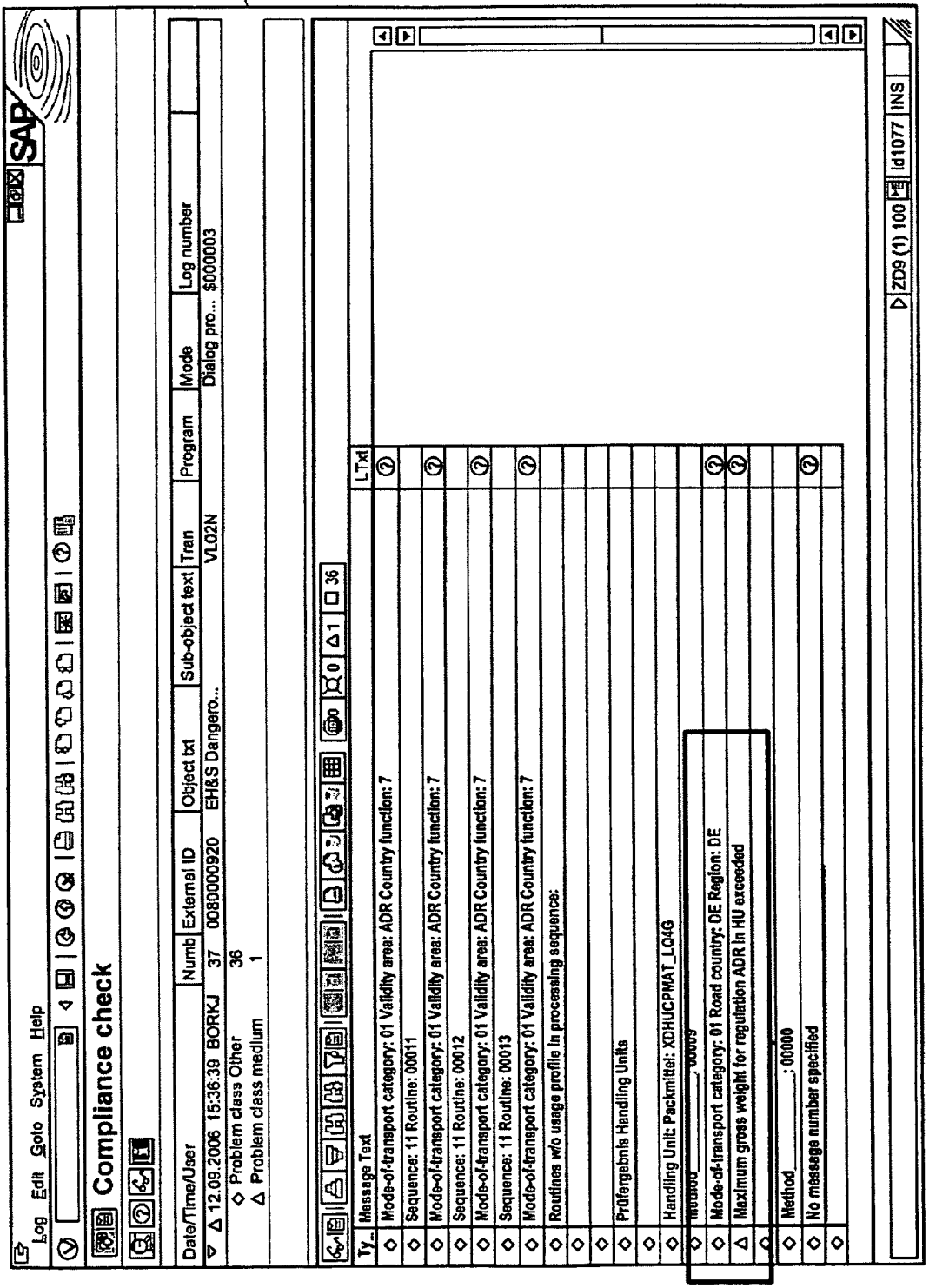
FIG. 10 illustrates an exemplary window of a user interface for outputting the results of a compliance check for the handling unit data, consistent with the invention.

FIG. 10 illustrates an exemplary window 1000 that is generated as a result of the compliance check performed by the processor on the instantiated handling unit as illustrated in FIG. 9, consistent with an embodiment of the present invention. The result of the compliance check indicates an error message stating "maximum gross weight for regulation ADR in HU exceeded." In response, the user may go back to window 900, as shown in FIG. 9, and press virtual button 902.

Figure 11:
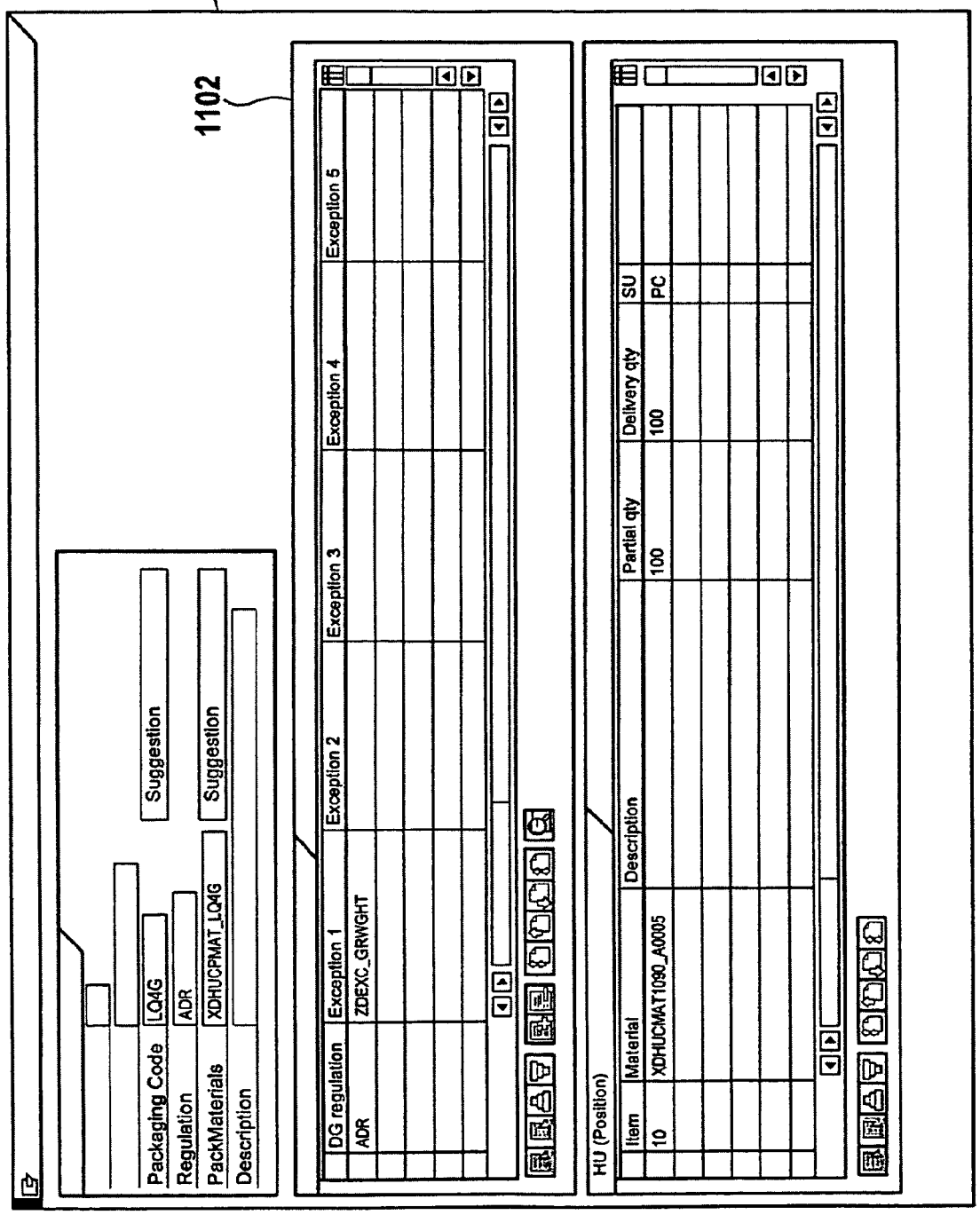
FIG. 11 illustrates an exemplary window for entering a transactional exception for the handling unit, consistent with the invention.

In response, a window 1100 is generated, as shown in FIG. 11. Window 1100 comprises a table 1102 for entry of one or more transactional exceptions by the user. In response to a user's entry of a transactional exception, the compliance check is re-executed using the applicable regulation as modified by the transactional exception.

Figure 12:
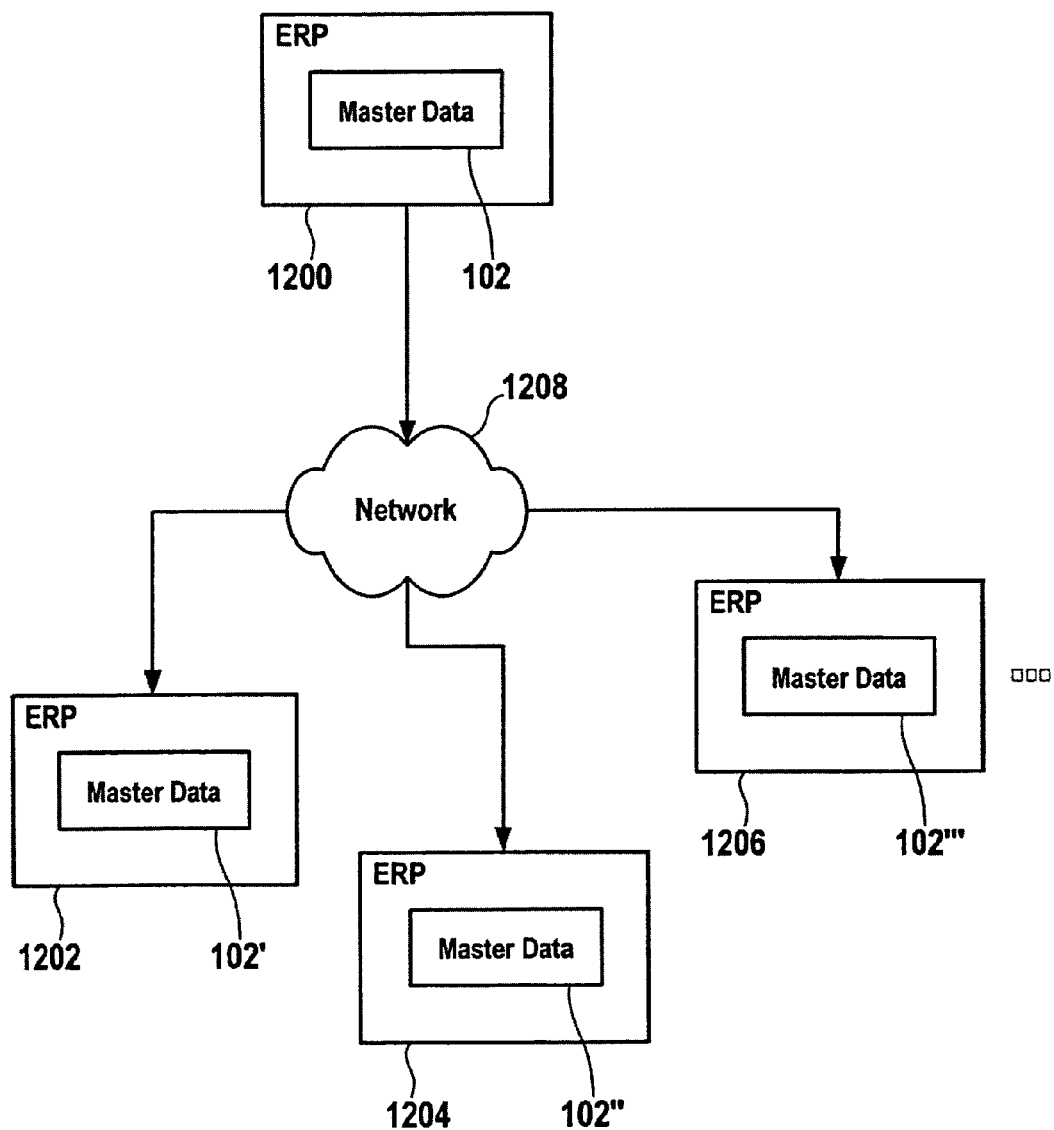
FIG. 12 is a block diagram illustrating an exemplary distributed system for managing the transportation of dangerous goods, consistent with the invention.

FIG. 12 illustrates an exemplary block diagram of a distributed system for managing the transportation of dangerous materials consistent with embodiments of the present invention. The distributed system comprises a route enterprise resource planning (ERP) system 1200 that is coupled to a number of target ERP systems 1202, 1204, 1206, etc., by a network 1208. The target ERP systems have respective database systems 102', 102'', 102''', etc., for storing replicas of the master data, including the exception data contained in the exception database table, of the master data stored in database system 102 of route ERP system 1200. Updates of the exception data can be distributed efficiently to the target ERP systems. Any suitable replication procedure can be used for this purpose.

The efficient distribution of exceptions from a route ERP system to various target ERP systems that can be located in various parts of the world may provide efficient and effective management of the transportation of dangerous materials both to ensure optimum environmental protection and to prevent acts of sabotage and terrorism regarding the transportation of dangerous materials.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. Further, computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A system for managing the transportation of dangerous materials comprising:

a database for storing master data for a set of materials, the materials having regulations applicable to the transportation of the materials, wherein the master data includes:
  an identifier of at least one exception that defines a modification to one of the regulations,
  a version of the at least one exception,
  a description of the at least one exception,
  a duration of the validity of the at least one exception, and
  a flag indicating that an assignment of the at least one exception to the one of the regulations is locked, the flag being deactivatable by an authorized user to unlock the assignment of the at least one exception to the one of the regulations;
a user interface for selecting a sub-set of the set of materials to be transported;
a processor for checking compliance of one or more conditions of the transportation of the sub-set of the set of materials with the regulations that are assigned to the materials of the sub-set; and
a document generator that, after the one or more conditions of the transportation of the sub-set of the set of materials are determined to be compliant with the regulations that are assigned to the materials of the sub-set, is invoked to generate a transportation document including the description of the at least one exception, wherein the transportation document is attachable to a handling unit including the sub-set of the set of materials.

2. The system of claim 1, wherein the database stores first master data comprising material master data, second master data for assigning the regulations to the materials and for indicating the existence of the at least one exception, and third master data for defining the at least one exception.

3. The system of claim 1, the user interface being adapted to receive user-entered delivery data, handling unit data, and transportation route data for specifying the transportation of the sub-set of materials.

4. The system of claim 3, wherein the processor sequentially checks the delivery data, the handling unit data, and the transportation route data for compliance with the regulations.

5. The system of claim 1, wherein the user interface receives user-entered transactional data, the transactional data specifying the sub-set and a transactional exception of one of the regulations being applicable to one of the materials of the sub-set.

6. The system of claim 1, wherein the user interface receives user entry of the at least one exception.

7. The system of claim 1, wherein the transportation document is an adhesive label.

8. The system of claim 1, wherein the master data further includes a second flag indicating whether the at least one exception is company-specific.

9. A computer-implemented method of managing the transportation of dangerous materials comprising:
  selecting, by a processor, a sub-set of a set of materials from a database, the database storing master data for the set of materials, the materials having regulations applicable to the transportation of the materials, wherein the master data includes:
    an identifier of at least one exception that defines a modification of one of the regulations,
    a version of the at least one exception,
    a description of the at least one exception,
    a duration of the validity of the at least one exception, and
    a flag indicating that an assignment of the at least one exception to the one of the regulations is locked, the flag being deactivatable by an authorized user to unlock the assignment of the at least one exception to the one of the regulations;
  checking, by the processor, one or more conditions of the transportation of the sub-set of the set of materials for compliance with the regulations that are assigned to the materials of the sub-set; and
  invoking, after the one or more conditions of the transportation of the sub-set of the set of materials are determined to be compliant with the regulations that are assigned to the materials of the sub-set, a document generator that generates a transportation document including the description of the at least one exception, wherein the transportation document is attachable to a handling unit including the sub-set of the set of materials.

10. The method of claim 9, further comprising:
  receiving delivery data, handling unit data, and transportation route data; and
  sequentially checking the delivery data, the handling unit data, and the transportation route data for compliance with the regulations that are assigned to the materials of the sub-set.

11. The method of claim 9, wherein the database stores first master data comprising material master data, second master data for assigning the regulations to the materials and for indicating the existence of the at least one exception, and third master data for defining the at least one exception, the method further comprising:
  accessing the third master data for reading the at least one exception, wherein the compliance check is performed using the at least one exception that has been read from the third master data.

12. The method of claim 9, further comprising:
  receiving transactional exception data for defining a transactional exception of at least one of the regulations that are assigned to the materials of the sub-set, wherein the compliance check is performed using the transactional exception.

13. The method of claim 9, wherein the compliance check is performed using master data defining the at least one exception, if any, and using a transactional exception that has been entered by a user as transactional data, if any.

14. The method of claim 9, further comprising:
  outputting a first signal indicative of compliance of the sub-set of the materials with the applicable regulations as modified by the at least one exception, and outputting a second signal indicative of non-compliance if at least one of the regulations as modified by the at least one exception is not complied with.

15. The method of claim 14, further comprising:
  in response to the second signal, modifying the master data by entering an additional exception for defining a modification of one of the regulations or entering a transactional exception for defining a modification of the one of the regulations and rerunning the compliance check.

16. The method of claim 9, wherein the master data further includes a second flag indicating whether the at least one exception is company-specific.

17. A distributed system for managing the transportation of dangerous materials, the distributed system comprising:
  a root system and a plurality of target systems linked to the root system by a telecommunications network;
  the root system comprising:

a first database for storing master data for a set of materials, the materials having regulations applicable to the transportation of the materials, wherein the master data includes:
- an identifier of at least one exception that defines a modification to one of the regulations,
- a version of the at least one exception,
- a description of the at least one exception,
- a duration of the validity of the at least one exception, and
- a flag indicating that an assignment of the at least one exception to the one of the regulations is locked, the flag being deactivatable by an authorized user to unlock the assignment of the at least one exception to the one of the regulations;

a first user interface for selecting a sub-set of the set of materials to be transported;

a first processor for checking compliance of one or more conditions of the transportation of the sub-set of the set of materials with the regulations that are assigned to the materials of the sub-set;

a document generator that, after the one or more conditions of the transportation of the sub-set of the set of materials are determined to be compliant with the regulations that are assigned to the materials of the sub-set, is invoked to generate a transportation document including the description of the at least one exception, wherein the transportation document is attachable to a handling unit including the sub-set of the set of materials; and a first interface for replication of the master data in the target systems; and the target systems comprising:
- a second database for storing replicated master data for the set of materials;
- a second user interface for selecting the sub-set of the set of materials to be transported;
- a second processor for checking compliance of the sub-set with the regulations that are assigned to the materials of the sub-set; and
- a second interface for replication of the master data by the route system.

18. The distributed system of claim 17, wherein the root system and the target systems are enterprise resource planning systems.

* * * * *